US005279655A

United States Patent [19]

Takazawa et al.

[11] Patent Number: 5,279,655

[45] Date of Patent: Jan. 18, 1994

[54] PRINTER INK COMPOSITION AND PRINTING MEDIUM USING THE SAME

[75] Inventors: Chiyoko Takazawa, Osaka; Hisayuki Akasako, Suita; Masami Shini, Takatsuki; Yoshikazu Shimazaki, Osaka, all of Japan

[73] Assignee: Fujicopian Co., Ltd., Osaka, Japan

[21] Appl. No.: 849,042

[22] PCT Filed: Aug. 30, 1991

[86] PCT No.: PCT/JP91/01164

§ 371 Date: Apr. 24, 1992

§ 102(e) Date: Apr. 24, 1992

[87] PCT Pub. No.: WO92/04416

PCT Pub. Date: Mar. 19, 1992

[30] Foreign Application Priority Data

| | | | |
|---|---|---|---|
| Aug. 30, 1990 | [JP] | Japan | 2-230429 |
| Oct. 19, 1990 | [JP] | Japan | 2-282735 |
| Jun. 19, 1991 | [JP] | Japan | 3-147396 |

[51] Int. Cl.$^5$ C09D 11/02

[52] U.S. Cl. 106/22 D; 106/23 D; 106/402; 106/493

[58] Field of Search 106/22 D, 23 D, 402, 106/493; 552/113, 114; 428/289

[56] References Cited

U.S. PATENT DOCUMENTS

| | | | |
|---|---|---|---|
| 2,950,285 | 8/1960 | Miller et al. | 106/22 D |
| 3,353,972 | 11/1967 | Sinclair | 106/22 H |
| 3,617,185 | 11/1971 | Drautz | 106/27 R |
| 3,705,045 | 12/1972 | Nadolski | 106/22 D |
| 4,101,329 | 7/1978 | Loock | 106/22 D |
| 4,108,671 | 8/1978 | Richlin | 106/22 R |
| 4,142,914 | 3/1979 | Bast et al. | 106/22 D |
| 4,357,431 | 11/1982 | Murakami et al. | 106/31 R |
| 4,657,590 | 4/1987 | Gamblin | 106/26 R |
| 4,773,937 | 9/1988 | Schneider et al. | 106/493 |
| 4,842,646 | 6/1989 | Gamblin | 106/22 D |
| 4,988,123 | 1/1991 | Lin et al. | 106/25 R |
| 5,082,498 | 1/1992 | Kurtz et al. | 106/499 |
| 5,120,359 | 6/1992 | Uzukawa et al. | 106/500 |

FOREIGN PATENT DOCUMENTS

| | | |
|---|---|---|
| 0225606 | 6/1987 | European Pat. Off. . |
| 3047925 | 7/1982 | Fed. Rep. of Germany . |
| 3715836 | 11/1987 | Fed. Rep. of Germany . |
| 2381805 | 9/1978 | France . |
| 60-28470 | 2/1985 | Japan . |
| 61-204286 | 9/1986 | Japan . |
| 2-11671 | 1/1990 | Japan . |

*Primary Examiner*—Helene Klemanski

*Attorney, Agent, or Firm*—Armstrong, Westerman, Hattori, McLeland & Naughton

[57] ABSTRACT

A printer ink composition containing a triphenylmethane dye or a lake pigment derived therefrom as a coloring agent, including as the coloring agent a triphenylmethane dye having general formula (I):

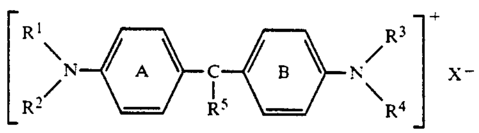

(I)

wherein $R^1$, $R^2$, $R^3$ and $R^4$ are independently hydrogen atom, an alkyl group, an aralkyl group or an aryl group, $R^5$ is an aryl group, $X^-$ is a counter ion, and ring A or ring B may be substituted by one or more substituents, provided that at least one group among $R^1$, $R^2$, $R^3$ and $R^4$ is not methyl and in the case that $R^5$ is p-dimethylaminophenyl, at least one of $R^1$ and $R^2$ and at least one of $R^3$ and $R^4$ are not methyl; or a lake pigment derived therefrom, in order to prevent the formation of Michler's ketone. The ink composition is used for printing media for printer such as fabric ink ribbon, ink roll, ink-retaining element, thermal transfer ink ribbon, and pressure-sensitive transfer ink ribbon.

4 Claims, No Drawings

PRINTER INK COMPOSITION AND PRINTING MEDIUM USING THE SAME

TECHNICAL FIELD

The present invention relates to a printer ink composition and a printing medium using the same. More particularly, it relates to a liquid or solid ink composition for a printer and a printing medium using the same.

BACKGROUND ART

The printer liquid ink is composed of a coloring agent and a liquid vehicle and used in printing media for impact type selective printers such as a typewriter using type set and a wire dot printer. Such printing media include, for instance, a fabric ink ribbon using a nylon woven cloth or the like as a ribbon material, and an ink roll or an ink-retaining element for supplying an ink to a fabric ink ribbon, types, etc.

The printer solid ink is composed of a coloring agent and a solid vehicle. The ink includes a heat transferable solid ink which is softened or melted upon heating to be transferred, and a pressure-sensitive transferable solid ink which is transferred upon being subjected to a pressure. The former is used in printing media for thermal transfer type selective printers equipped with a head such as a heating head, a laser head or a head for supplying electric current. The latter is used in printing media for impact type selective printers such as a typewriter using type set and a wire dot printer.

Such printing media include, for instance, a one-time thermal transfer ink ribbon wherein a homogeneous layer of a heat transferable solid ink is formed on a film foundation; a multi-usable thermal transfer ink ribbon wherein on a foundation is formed a porous layer containing a heat transferable solid ink or a heat transferable solid ink layer containing a barrier material; and a one-time pressure-sensitive transfer ink ribbon wherein a homogeneous layer of a pressure-sensitive transferable ink composition is formed on a film foundation.

Heretofore, this type of ink composition uses such triphenylmethane dyes as mentioned below, as a main component of the coloring agent thereof. The reason is that the dyes have a high tinting strength or that the dissolution or dispersion of the dyes into a vehicle can be made ready by converting them to bases.

C.I. Basic Green 4 (C.I. 42000, Malachite Green)

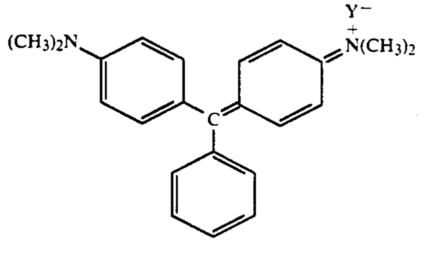

C.I. Basic Violet 3 (C.I. 42555, Crystal Violet)

-continued

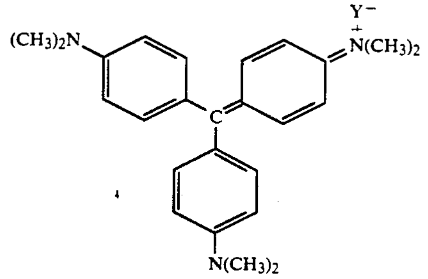

C.I. Basic Blue 8 (C.I. 42563, Victoria Blue B)

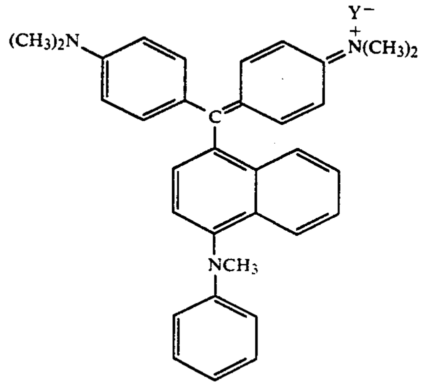

C.I. Basic Violet 1 (C.I. 42535, Methyl Violet)

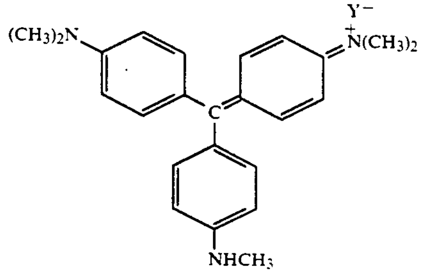

In the above, $Y^-$ represents a counter ion. The ion $Y^-$ widely used is residues of organic acids such as oleic acid.

There are also used lake pigments derived from the above-mentioned triphenylmethane dyes, including C.I. Pigment Green 4 (C.I. 42000:2), C.I. Pigment Violet 39 (C.I. 42555:2), C.I. Pigment Violet 3 (C.I. 42535:2) and C.I. Pigment Violet 27 (C.I. 42535:3).

However, the above-mentioned triphenylmethane dyes and the lake pigments thereof undergo oxidation decomposition with the passage of time to change to Michler's ketone mentioned below. The Michler's ketone has a carcinogenesis (see "Bioassay of Michler's Ketone for Possible Carcinogenicity", National Cancer Institute Carcinogenesis Technical Report Series, No. 181, 1979, U.S. Department of Health, Education and Welfare Public Health Service National Institute of Health).

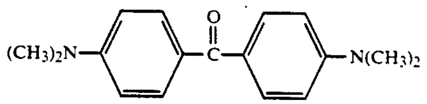

Therefore, in the case of using an ink containing the above-mentioned triphenylmethane dye or the lake pigment thereof as a coloring agent, there is the danger that Michler's ketone is incorporated into a human body to become a carcinogen due to contact of the human body with an ink or printed matters obtained using the ink in the preparation of the ink, the production of printing media, the storage of the printing media, printing with using the printing media, or thereafter, or due to the sublimatiom or volatilization of Michler's ketone formed by the oxidation decomposition.

Recently, from the viewpoint of saving of resources, there is the tendency that waste paper is regenerated to be used again. However, when printed matters contain the triphenylmethane dye or the lake pigment thereof, or Michler's ketone derived therefrom, the paper regenerated therefrom inevitably contains carcinogen.

In view of the above-mentioned, it is an object of the present invention to provide a liquid or solid ink composition for a printer which does not possess carcinogenesis and is safe in spite of using a triphenylmethane dye or a lake pigment derived therefrom.

DISCLOSURE OF THE INVENTION

The present invention provides a printer ink composition containing a coloring agent and a vehicle, comprising, as a triphenylmethane dye or a lake pigment derived therefrom as the coloring agent, a triphenylmethane dye having general formula (I):

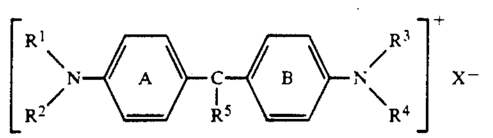

(I)

wherein $R^1$, $R^2$, $R^3$ and $R^4$ are independently hydrogen atom, an alkyl group, an aralkyl group or an aryl group, $R^5$ is an aryl group, $X^-$ is a counter ion, and ring A or ring B may be substituted by one or more substituents, provided that at least one group among $R^1$, $R^2$, $R^3$ and $R^4$ is not methyl and in the case that $R^5$ is p-dimethylaminophenyl, at least one of $R^1$ and $R^2$ and at least one of $R^3$ and $R^4$ are not methyl; or a lake pigment derived therefrom.

The triphenylmethane dye represented by general formula (I) or the lake pigment derived therefrom does not form Michler's ketone even though it undergoes an oxidation decomposition with the passage of time. Accordingly, there is no danger of carcinogenesis due to contact with inks containing the dye or pigment, printing media such as ink ribbon and printed matters, and other causes.

Hereinafter, the ink composition of the present invention will be more specifically explained.

With respect to general formula (I), the alkyl group represented by $R^1$, $R^2$, $R^3$ and $R^4$ includes alkyl groups having 1 to 12 carbon atoms, such as methyl, ethyl, propyl, butyl sec-butyl, tert-butyl, amyl, ethylhexyl, nonyl, decyl and lauryl. The alkyl group may be substituted by one or more substituents. Examples of such substituents are hydroxyl group, alkoxyl group (such as methoxy and ethoxy), halogen group, sulfo group, carboxyl group and nitro group.

The aralkyl group includes aralkyl groups having 7 to 15 carbon atoms, such as benzyl, phenylethyl, diphenylmethyl and naphthylmethyl. The aralkyl group may be substituted by one or more substituents. Examples of such substituents are alkyl group (such as methyl and ethyl), hydroxyl group, alkoxyl group (such as methoxy and ethoxy), halogen group, sulfo group, carboxyl group and nitro group.

The aryl group includes phenyl and naphthyl. The aryl group may be substituted by one or more substituents. Examples of such substituents are alkyl group (such as methyl and ethyl), hydroxyl group, alkoxyl group (such as methoxy and ethoxy), halogen group, sulfo group, carboxyl group and nitro group.

The aryl group represented by $R^5$ includes phenyl and naphthyl. The aryl group represented by $R^5$ may be substituted by one or more substituents. Examples of the substituents are amino group, N-alkylamino group, N,N-dialkylamino group, N-aralkylamino group, N,N-diaralkylamino group, N-arylamino group, N,N-diarylamino group, N-alkyl-N-aralkylamino group, N-alkyl-N-arylamino group, N-aralkyl-N-arylamino group, alkyl group, hydroxyl group, alkoxyl group (such as methoxy and ethoxy), halogen group, sulfo group, carboxyl group and nitro group. The alkyl group, the aralkyl group and the aryl group which are contained in the above-mentioned substituents include examples similar to those of the alkyl group, the aralkyl group and the aryl group, respectively, in the above-mentioned $R^1$, $R^2$, $R^3$ and $R^4$. Preferred examples of the substituted aryl group as $R^5$ are, for instance, 4-diethylaminophenyl, 4-ethylamino-1-naphthyl, 4-phenylamino-1-naphthyl, 4-diethylamino-1-naphthyl, 4-(N-methyl-N-phenylamino)-1-naphthyl and 4-diethylamino-3-chlorophenyl.

Ring A and/or ring B may be substituted by one or more substituents. Examples of such substituents are alkyl group (such as methyl and ethyl), hydroxyl group, alkoxyl group (such as methoxy and ethoxy), halogen group, sulfo group, carboxyl group and nitro group.

The counter ion represented by $X^-$ includes anions of organic acid residues and anions of inorganic acid residues. Concrete examples of the organic acid include aliphatic carboxylic acids such as lauric acid, myristic acid, palmitic acid, stearic acid, isostearic acid, oleic acid, adipic acid, citric acid and ascorbic acid; aromatic carboxylic acids such as benzoic acid, salicylic acid, phthalic acid, isophthalic acid, terephthalic acid, naphthoic acid, gallic acid and tannic acid; and sulfonic acids such as dodecyl sulfonic acid and alkylbenzenesulfonic acid.

The inorganic acid used in preparing lake pigments from the above-mentioned dyes usually includes complex inorganic acids such as phosphomolybdic acid and phosphotungstic acid, which may be used singly or in admixture.

From the triphenymethane dye represented by general formula (I) or the lake pigment derived therefrom, there are excluded those wherein $R^1$, $R^2$, $R^3$ and $R^4$ are methyl at the same time, and those wherein $R^5$ is p-dimethylaminophenyl and $R^1$ and $R^2$ are methyl at the same time or $R^3$ and $R^4$ are methyl at the same time, i.e. possible compounds which generate Michler's ketone by virtue of oxidation decomposition. Those wherein $R^1$, $R^2$, $R^3$ and $R^4$ are hydrogen atom at the same time do not generate Michler's ketone. However, it is desirable not to use them because of their own strong toxicity.

Triphenylmethane dyes wherein $R^1$, $R^2$, $R^3$ and $R^4$ in general formula (I) are the same group, particularly ethyl, are especially preferred.

The representative examples of the triphenylmethane dye used in the present invention are as follows.

C.I. Basic Green 1 (C.I. 42040)

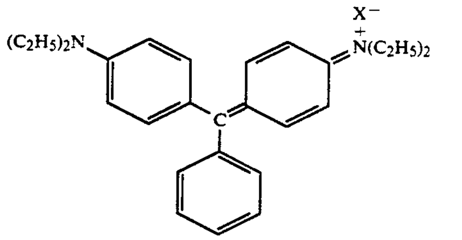

C.I. Basic Violet 4 (C.I. 42600. Ethyl Violet)

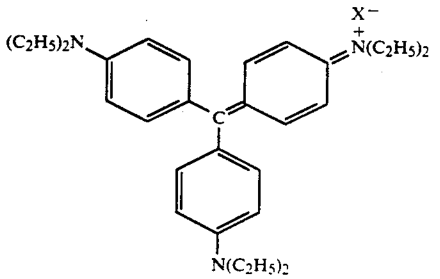

C.I. Basic Blue 7 (C.I. 42595)

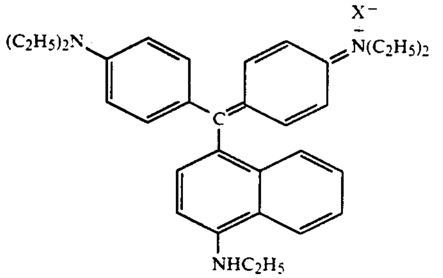

The representative examples of the lake pigment derived from the triphenylmethane dye used in the present invention include lake pigments corresponding to the above-mentioned triphenylmethane dyes, i.e. C.I. Pigment Green 1 (C.I. 42040:1), C.I. Pigment Blue 14 (C.I. 42600:1) and C.I. Pigment Blue 1 (C.I. 42595:2).

Other examples of the triphenylmethane dye and the lake pigment thereof usable in the present invention include C.I. Basic Blue 5 (C.I. 42140), C.I. Basic Blue 18 (C.I. 42705), C.I. Solvent Blue 23 (C.I. 42760), C.I. Basic Blue 15 (C.I. 44085), C.I. Pigment Blue 3 (C.I. 42140:1), C.I. Pigment Blue 12 (C.I. 42130), C.I. Pigment Blue 19 (C.I. 42750:1), C.I. Pigment Blue 61 (C.I. 42765:1), C.I. Pigment Blue 18 (C.I. 42770:1), C.I. Pigment Blue 57 (C.I. 42795) and C.I. Pigment Blue 56 (C.I. 42800).

In the present invention, the above-mentioned triphenylmethane dyes and lake pigments are used singly or in admixture. From the viewpoint of fastness of print image and others, it is preferable to use the triphenylmethane dye and the lake pigment thereof in combination.

So long as the specified dye or pigment mentioned above are used as the triphenylmethane dye or lake pigment thereof, other dye or pigment may be used in combination as the coloring agent in the ink composition of the present invention. The other dyes include various kinds of dyes such as azo dyes, anthraquinone dyes, phthalocyanine dyes, oxazine dyes, xanthene dyes, methine dyes, perinone dyes and induline dyes. The representative examples of black dyes are C.I. Solvent Black 7 (C.I. 50415:1, Nigrosine Base), C.I. Solvent Black 3 (C.I. 26150), C.I. Solvent Black 27, C.I. Acid Black 52 (C.I. 15711) and C.I. Acid Black 63 (C.I. 12195). The representative examples of blue dyes are C.I. Solvent Blue 7 (C.I. 50400, Induline Base), C.I. Solvent Blue 25 (C.I. 74350), C.I. Solvent Blue 35 (C.I. 61554), C.I. Solvent Blue 36 (C.I. 61551), C.I. Solvent Blue 70, C.I. Solvent Blue 78 (C.I. 61500), C.I. Solvent Blue 94 and C.I. Solvent Blue 95. The representative examples of red dyes are C.I. Solvent Red 3 (C.I. 12010), C.I. Solvent Red 8 (C.I. 12715), C.I. Solvent Red 18 (C.I. 21260), C.I. Solvent Red 19 (C.I. 26050), C.I. Solvent Red 24 (C.I. 26015), C.I. Solvent Red 155, C.I. Solvent Red 177, C.I. Solvent Red 111 (C.I. 60505), C.I. Solvent Red 146, C.I. Solvent Red 135, C.I. Basic Red 1 (C.I. 45160), C.I. Basic Red 36, C.I. Basic Red 13 (C.I. 48015), C.I. Basic Red 70, C.I. Disperse Red 60 and C.I. Vat Red 41 (C.I. 73300). The representative examples of violet dyes are C.I. Disperse Violet 4 (C.I. 61105), C.I. Solvent Violet 31, C.I. Solvent Violet 32, C.I. Solvent Violet 33, C.I. Solvent Violet 13 (C.I. 60725), C.I. Solvent Violet 11 (C.I. 61100), C.I. Vat Violet 1 (C.I. 60010) and C.I. Basic Violet 11 (C.I. 45175). The representative examples of yellow dyes are C.I. Solvent Yellow 16 (C.I. 12700), C.I. Solvent Yellow 29 (C.I. 21230) and C.I. Solvent Yellow 82. Examples of the other pigments are, for instance, carbon black, Phthalocyanine Blue, Phthalocyanine Green, Disazo Yellow, Aniline Black, Perylene Black, iron black, Process Magenta, Ultramarine Blue, Iron Blue, Lake Red and Permanent Red. Usually, it is preferable to use pigments in addition to dyes in order to improve fastness of print image. Further, there can be used body pigments or white pigments, including titanium oxide, zinc white, silicon dioxide, calcium carbonate, magnesium carbonate, barium sulfate and silicon nitride, as the need arises.

Hereinafter, the liquid ink composition of the present invention will be explained.

With respect to the vehicle in the liquid ink composition of the present invention, compositions and components used in conventional printer liquid inks can be used without any particular change. For example, the vehicle includes one wherein a dissolution medium for dye or a dispersion medium for pigment is used as a main component, and if necessary, a pigment-dispersing agent and a viscosity-adjusting agent are added, and further other additives such as antifungal agent are added.

Various non-volatile oily substances can be used as the dissolution medium for dye or the dispersion medium for pigment. Examples of the oily substance are, for instance, vegetable oils such as rapeseed oil, castor oil and soybean oil; animal oils such as beef foot oil; higher fatty acids such as isostearic acid and oleic acid (all the higher fatty acids exemplified as $X^-$ in the above can be used). One kind of or mixtures of two or more kinds of these can be used.

Examples of the pigment-dispersing agent are, for instance, sorbitan fatty acid ester, polyoxyethylene sorbitan fatty acid ester, polyoxyethylene sorbitan alkyl ether, glycerin fatty acid ester, propylene glycol fatty acid ester, polyethylene glycol fatty acid ester, polyoxyethylene alkyl ether, hardened castor oil derivative and polyoxyethylene castor oil. One kind of or mixtures of two or more kinds of these can be used.

Examples of the viscosity-adjusting agent are, for instance, mineral oils such as motor oil; and synthetic oils such as olefin-polymerized oil (e.g. ethylene hydrocarbon oil, butylene hydrocarbon oil, and the like), diester oils (e.g. dioctyl phthalate, dioctyl sebacate, di(1-ethylpropyl) sebacate, dioctyl azelate, dioctyl adipate, and the like), and silicone oils (e.g. linear dimethyl polysiloxane having a low viscosity, and the like). One kind of or mixtures of two or more kinds of these can be used.

In the liquid ink composition of the present invention, the above-mentioned coloring agent, dye-dissolution or pigment-dispersion medium, pigment-dispersing agent and viscosity-adjusting agent are usually added in the below-mentioned ranges, on the basis of the total amount of the ink composition.

| Component | % by weight |
|---|---|
| Coloring agent | 10 to 40 |
| Dye-dissolution or pigment-dispersion medium | 20 to 60 |
| Pigment-dispersing agent | 0 to 40 (preferably 10 to 20) |
| Viscosity-adjusting agent | 0 to 40 (preferably 20 to 30) |

The liquid ink composition of the present invention can be used in a variety of printing media for printer, for example, fabric ink ribbons, and ink rolls, ink-retaining elements, and the like, for supplying ink to fabric ink ribbons, types, and the like. Any conventional substrate can be used as the substrate for such printing media without any particular limitation.

Woven cloths of various kinds of fibers such as nylon, polyester, cotton and silk can be used as a substrate for the fabric ink ribbon. Usually a suitable thickness of the substrate is from about 80 to about 140 μm. The ink composition is contained in an amount of about 8 to about 21 $g/m^2$ into the substrate.

Open-cell porous body made of various kinds of rubbers or resins, including acrylonitrile-butadiene rubber, styrene-butadiene rubber, urethane rubber, polyethylene, polypropylene and vinyl chloride resin, can be used as an open-cell porous body for the ink roll. Usually, suitable porous bodies have an average pore diameter of about 20 to about 200 μm, a porosity of about 70 to 80% and a hardness of about 5° to about 50° H.

Felts, nonwoven fabrics, sponges made of rubbers or resins, metallic porous bodies, ceramic porous bodies, and the like, can be used as an open-cell porous body for the ink-retaining element. Usually suitable porous bodies have a porosity of about 70 to about 95%.

Hereinafter, the solid ink composition of the present invention will be explained.

The solid ink composition of the present invention is used as an ink for a variety of uses. For example, it is used as a solid ink for one-time thermal transfer ink ribbons, multi-usable thermal transfer ink ribbons, one-time pressure-sensitive transfer ink ribbons and multi-usable pressure-sensitive transfer ink ribbon, and the like.

With respect to the solid ink for such uses, conventional vehicles and others can be used without any particular change except that the specified coloring agent as mentioned above is used as the coloring agent.

Hereinafter, a first explanation will be given for the one-time thermal transfer ink ribbon. The vehicle of solid ink for the ribbon is preferably a vehicle composed of a wax-like substance as a main component or a vehicle composed of a mixture of a wax-like substance and a thermoplastic resin as a main component. Examples of the wax-like substance include natural waxes such as carnauba wax, whale wax, haze wax, bees wax, lanolin, montan wax and ceresine wax; petroleum waxes such as paraffin wax and microcrystalline wax; synthetic waxes such as low molecular weight polyethylene, oxidized wax and ester wax; higher fatty acids such as lauric acid, myristic acid, palmitic acid, stearic acid and behenic acid; higher aliphatic alcohols such as stearyl alcohol and behenyl alcohol; esters such as higher fatty acid monoglycerides, sucrose fatty acid esters and sorbitan fatty acid esters; and amides such as oleic amide. One or more kinds of these wax-like substances are appropriately used. Examples of the thermoplastic resin include ethylene-vinyl acetate copolymer, petroleum resin, polyvinyl acetate, polystyrene, styrene-butadiene copolymer and acrylic resin. One or more kinds of these resins are appropriately used.

In the preparation of the one-time thermal transfer solid ink composition, it is suitable to disperse about 0.1 to about 30 parts (parts by weight, hereinafter the same) of the above-mentioned coloring agent in accordance with the present invention into 100 parts of the above vehicle. In that case, other additives such as antistatic agent, dispersing agent and body pigment can be appropriately dispersed as the need arises.

The ink composition preferably has a melting or softening temperature of about 50° to about 150° C., and a viscosity (value measured by means of a rheometer made by Rheology Co., Ltd., hereinafter the same) of about 10 about $10^6$ cps at a temperature by 30° C. higher than the melting or softening temperature.

The above-mentioned ink composition is applied onto an appropriate foundation by hot-melt coating or in the form of a solution or a dispersion in a solvent, yielding a printer ink ribbon. The coating amount of the ink composition is preferably from 0.5 to 20 $g/m^2$ in solid basis after drying.

As the foundation, there are suitably used plastic films including polyesters such as polyethylene terephthalate, polyethylene, polypropylene, polycarbonate, polyimide and polystyrene, cellophane, synthetic paper, glassine paper, condenser paper, laminated paper, etc. The thickness of the foundation is preferably from about 2 to about 10 μm, more preferably from about 3 to about 7 μm from the viewpoint of obtaining a good heat conduction.

In the case of using the above-mentioned plastic film, there is preferably provided on the rear surface of the foundation (the surface in sliding contact with a heating heat) a conventional stick preventing layer composed of various lubricative heat-resistant resins such as silicone resin, fluorine-containing resin and nitrocellulose, other resins modified with the foregoing resins, and mixtures of the foregoing heat-resistant resins with lubricating agents.

With respect to the ink composition for a scraping type ink ribbon (wherein the ink layer is transferred in increments relative to the thickness thereof at every time when the ink layer is heated) among multi-usable thermal transfer ink ribbons, there is used a dispersion composed of 100 parts of a vehicle comprising a wax-like substance and a thermoplastic resin, and 80 to 120 parts of a mixture of a coloring agent and nonthermoplastic minute particles (such as carbon black). The coloring agent may be present in the form of fine particles or in the form of powder with being mixed with the nonthermoplastic minute particles, or may be attached to the nonthermoplastic minute particles so as to cover the surface of the each particle. It is enough that the proportion occupied by the coloring agent in the above-mentioned mixture is not less than 1% by weight. Even though the whole of the above-mentioned mixture is composed of a coloring agent alone, there is no problem.

With respect to the ink composition for an exuding type ink ribbon among multi-usable thermal transfer ink ribbons, there is used one wherein to a dispersion of 100 parts of a vehicle comprising a wax-like substance and a thermoplastic resin and 15 to 50 parts of a coloring agent is added a resin binder which has a nonthermoplasticity (which means that the binder is not plasticized at the transfer temperature) and is incompatible with the vehicle, in an amount of 20 to 30% of the dispersion, followed by mixing and dispersing.

In the case of both the scraping type ink ribbon and the exuding type ink ribbon, other additives such as antistatic agent, dispersing agent and body pigment can be appropriately added as the need arises.

The above-mentioned ink composition preferably has a melting or softening temperature of about 50° to about 150° C. and a viscosity of about $10^2$ to about $10^7$ cps at a temperature 30° C. higher than the melting or softening temperature.

The above-mentioned thermal transfer ink composition is applied onto an appropriate foundation by solvent coating, yielding a multi-usable thermal transfer ink ribbon. The coating amount of the ink composition is preferably from 2 to 30 $g/m^2$ in solid basis after drying. Materials similar to those for the above-mentioned one-time ink ribbon can be used as the foundation. Similarly in the case of the one-time type ink ribbon, it is preferable to provide a stick preventing layer.

In the case of the one-time pressure-sensitive transfer ink ribbon, the vehicle includes a softening agent in addition to wax-like substances and resins similar to those for the thermal transfer ink ribbon. Examples of the softening agent are mineral oils, animal and vegetable oils and plasticizing agents, including paraffin oil, rapessed oil, castor oil, dioctyl azelate, dioctyl sebacate, diethyl phthalate, tributyl acetylcitrate and lanolin. Liquid surface active agents can also be suitably used.

In the preparation of the above-mentioned one-time pressure-sensitive transfer ink composition, it is suitable to disperse about 0.1 to about 30 parts of the above-mentioned coloring agent in accordance with the present invention into 100 parts of the above vehicle. In that case, other additives such as antistatic agent, dispersing agent and body pigment can be appropriately dispersed as the need arises.

The above-mentioned pressure-sensitive transfer ink composition is applied onto an appropriate foundation by an appropriate method such as hot-melt coating method or solvent coating method so that the amount of solid after drying is from 2 to 10 $g/m^2$.

In the case of the multi-usable pressure-sensitive transfer ink ribbon, the ink composition includes one wherein to a dispersion of about 0.1 to about 30 parts of the coloring agent in accordance with the present invention in 100 parts of a vehicle is added a resin binder in an amount of 10 to 50 parts per 100 parts of the above dispersion, followed by mixing and dispersing. Examples of the resin binder are vinyl chloride-vinyl acetate copolymer, polyester, cellulose acetate butyrate, polyurethane, polyvinyl, butyral, vinylidene chloride resin, polystyrene and acrylic resin.

As the above-mentioned vehicle, there can be used mineral oils, animal and vegetable oils and plasticizing agents, including paraffin oil, rapessed oil, castor oil, dioctyl azelate, dioctyl sebacate, diethyl phthalate, tributyl acetylcitrate and lanolin. Liquid surface active agents can also be suitably used. Further, waxes and the like can also be appropriately added.

Other additives such as antistatic agent, dispersing agent and body pigment can also be appropriately added to the above ink composition as the need arises.

The above-mentioned multi-usable pressure-sensitive transfer ink composition, after being dissolved into a solvent, is applied onto an appropriate foundation by using a bar coater, gravure coater, a reverse roll coater, and the like, so that the amount of solid after drying is from 15 to 30 $g/m^2$.

BEST MODE FOR CARRYING OUT THE INVENTION

The present invention will be explained by referring to Examples and Comparative Examples.

EXAMPLE 1

0.1N NaOH was added dropwise to a solution prepared by dissolving 20 g of C.I. Basic Green 1 (commercial name: Aizen Diamond Green GH, made by HODOGAYA CHEMICAL CO., LTD.) as a dye into 2 l of distilled water. A gray-brown precipitate was formed and the color of the solution was gradually lightened. The thus formed precipitate was taken by filtration and washed with distilled water several times and dried to give a base of the dye.

10 g of the dye base was dissolved into 20 g of oleic acid under heating at 70° C. To the resultant were added 5 g of a mineral oil (HVI oil), 10 g of dioctyl sebacate and 5 g of Phthalocyanine Green (C.I. Pigment Green 7). The mixture was kneaded and dispersed by means of a roll mill having three rolls to give a green ink composition.

The ink composition was applied to and contained into a commercially available ribbon substrate made of nylon 66 (width: 13 mm, thickness: 115 μm) in an amount of about 12 $g/m^2$ to give an ink ribbon.

The obtained ink ribbon was mounted in a commercially available personal computer (made by SEIKO EPSON CORPORATION) and printing was conducted to give a clear green print image.

With respect to the above ink ribbon, the formation of Michler's ketone due to change with the passage of time was investigated. The formation of Michler's ketone was not absolutely observed.

The above test was conducted in such a manner as follows.

The ink ribbon was allowed to stand in an atmosphere of 50° C. and 90% RH for one month in order to accelerate the change with the passage of time (hereinafter referred to as "accelerating treatment"). Thereafter the amount of Michler's ketone in the ink of the ribbon was determined in such a manner as follows.

About 1 m length (the weight of ribbon: about 0.85 g, the weight of ink: about 0.15 g) of the ink ribbon was cut off. The specimen was placed in a 100 ml beaker and about 30 ml of tetrahydrofuran was added thereto. The ink was extracted by washing by means of an ultrasonic washer for about 15 minutes. The ribbon was taken out and placed in another beaker and 30 ml of tetrahydrofuran was added thereto. The extraction was again conducted by means of the ultrasonic washer. This operation was conducted once more. The thus obtained extracts were combined and the solvent was evaporated to recover only the ink. The recovered ink was made into a 0.1% by weight solution. A mixture of acetonitrile and water was used as a solvent. Michler's ketone was determined by means of a HPLC device made by Waters. The determination was conducted by using an analitical curve prepared by using a reagent grade of Michler's ketone.

COMPARATIVE EXAMPLE 1

The exactly same materials and procedures as in Example 1 except that C.I. Basic Green 4 (commercial name: Aizen Malachite Green made by HODOGAYA CHEMICAL CO., LTD.) was used instead of the dye used in Example 1 were used to prepare an ink composition and to produce an ink ribbon.

The same tests as in Example 1 was conducted with respect to the ink ribbon. A print image of the same quality as in Example 1 was obtained. However, the formation of Michler's ketone due to the change with the passage of time was observed. About 6.5% by weight of Michler's ketone was contained in the ink after the accelerating treatment for one month.

EXAMPLES 1 AND 3 AND COMPARATIVE EXAMPLES 2 AND 3

The same procedures as in Example 1 except that the dye and the pigment used in Example 1 were changed to those shown in Table 1 were repeated to give ink compositions and ink ribbons. With respect to each of the obtained ink ribbons, the formation of Michler's ketone after the accelerating treatment for one month was investigated in the same manner as in Example 1. The results thereof are shown in Table 1.

TABLE 1

| | Dye | Pigment | Amount of Michler's ketone in ink (% by weight) |
|---|---|---|---|
| Ex. 2 | C.I. Basic Blue 7 | Phthalocyanine Blue | Not detected |
| Com. Ex. 2 | C.I. Basic Blue 8 | Phthalocyanine Blue | 4.8 |
| Ex. 3 | C.I. Basic Violet 4 | Carbon black | Not detected |
| Com. Ex. 3 | C.I. Basic Violet 3 | Carbon black | 5.3 |

EXAMPLE 4

Into a solution prepared by dissolving 20 g of C.I. Basic Blue 7 (commercial name: Aizen Victoria Pure Blue, BOH, made by HODOGAYA CHEMICAL CO., LTD.) into 1.5 l of distilled water was added a solution prepared by dissolving 13 g of sodium dodecylbenzenesulfonate into 500 ml of distilled water. The formed precipitate was recovered and washed with water and dried to give a dodecylbenzenesulfonic acid salt of the dye.

8 g of this dye was dissolved into a mixture of 20 g of castor oil, 10 g of a mineral oil and 5 g of sorbitan monoisostearate. Further 7 g of C.I. Pigment Blue 1 was added thereto. The resultant was kneaded and dispersed by means of a roll mill having three rolls to give an ink composition. The same tests in Example 1 were conducted. As a result, a clear blue print image was obtained and Michler's ketone was not absolutely detected.

EXAMPLE 5

4 g of C.I. Solvent Blue 5 (free base of C.I. Basic Blue 7), 3 g of Rhodamine 6G derivative (commercial name: Spilon Red, made by HODOGAYA CHEMICAL CO., LTD.) and 0.5 g of Nigrosine Base (C.I. Solvent Black 7, Oriento Kagaku Kabushiki Kaisha) were dissolved under heating into a mixture of 3 g of lauric acid, 20 g of polyol oleic acid ester, 10 g of sorbitan monooleate and 7 g of dioctyl azelate. Further, 0.5 g of C.I. Pigment Blue 1 (made by BASF) and 2 g of C.I. Pigment Violet 1 (C.I. 45170:2) (made by BASF) were added thereto. The resultant was kneaded and dispersed by means of a roll mill having three rolls to give an ink composition. The same tests as in Example 1 were conducted. As a result, a deep violet print image was obtained and Michler's ketone was not absolutely detected.

EXAMPLES 6 TO 8 AND COMPARATIVE EXAMPLES 4 TO 6

15 g of each of the lake pigments derived from triphenylmethane dyes shown in Table 2 was used as a coloring agent. The lake pigment was added to a mixture of 15 g of a mineral oil, 5 g of polyoxyethylene sorbitan alkyl ether and 15 g of castor oil. The resultant was kneaded and dispersed by means of a roll mill having three rolls to give an ink composition. An ink ribbon was produced by using the ink composition.

With respect to each of the obtained ink ribbons, the formation of Michler's ketone was investigated after the accelerating treatment for one month in the same manner as in Example 1 except that the extraction of the ink from the ribbon was conducted by using isopropyl alcohol and the extract was subjected to the analysis after it was filtered through a membrane filter. The results thereof are shown in Table 2.

TABLE 2

| | Lake pigment | Amount of Michler's ketone in ink (% by weight) |
|---|---|---|
| Ex. 6 | C.I. Pigment Blue 14 | Not detected |
| Com. Ex. 4 | C.I. Pigment Violet 39 | 1.8 |
| Ex. 7 | C.I. Pigment Green 1 | Not detected |
| Com. Ex. 5 | C.I. Pigment Green 4 | 2.8 |
| Ex. 8 | C.I. Pigment Blue 1 | Not detected |
| Com. Ex. 8 | C.I. Pigment Violet 27 | 2.1 |

EXAMPLE 9

A soft open-cell porous body made of acrylonitrile-butadiene rubber (average pore diameter: 100 μm, porosity: 75%, hardness: 10° H, outer diameter: 8 mm, length: 54 mm) was impregnated with 1.5 g of the green ink composition obtained in Example 1 to give an ink roll.

The obtained ink roll was mounted in the printer of a commercially available electronic calculator (made by SEIKO EPSON CORPORATION, Model M 720) and printing was conducted. As a result, a clear print image having a good durability was obtained.

With respect to the ink roll, the formation of Michler's ketone was investigated after the accelerating treatment for one month in the same manner as in Example 1. The formation of Michler's ketone was not absolutely observed. The measuring of the amount of Michler's ketone was conducted by scratching off the ink present on the surface of the ink roll, dissolving the ink into a solvent, and subjecting the resulting solution to the determination on HPLC.

COMPARATIVE EXAMPLE 7

The exactly same procedures and materials as in Example 9 except that the dye in Example 9 was changed to C.I. Basic Green 4 (commercial name: Aizen Malachite Green, made by HODOGAYA CHEMICAL CO., LTD.) were used to prepare an ink composition and to produce an ink roll. The same tests as in Example 9 were conducted with respect to the ink roll. A print image of the same quality as in Example 9 was obtained. However, the formation of Michler's ketone due to the change with the passage of time was observed. About 7.1% by weight of Michler's ketone was contained in the ink after the accelerating treatment for one month.

EXAMPLES 10 AND 11 AND COMPARATIVE EXAMPLES 8 AND 9

The same procedures as in Example 9 except that the dye and the pigment used in Example 9 were changed to those shown in Table 3 were repeated to give ink compositions and ink rolls. With respect to each of the obtained ink rolls, the formation of Michler's ketone after the accelerating treatment for one month was investigated in the same manner as in Example 9. The results thereof are shown in Table 3.

TABLE 3

| | Dye | Pigment | Amount of Michler's ketone in ink (% by weight) |
|---|---|---|---|
| Ex. 10 | C.I. Basic Blue 7 | Phthalocyanine Blue | Not detected |
| Com. Ex. 8 | C.I. Basic Blue 8 | Phthalocyanine Blue | 3.9 |
| Ex. 11 | C.I. Basic Violet 4 | Carbon black | Not detected |
| Com. Ex. 9 | C.I. Basic Violet 3 | Carbon black | 4.5 |

EXAMPLE 12

5 g of C.I. Solvent Blue 5 (free base of C.I. Basic Blue 7), 3 g of Rhodamine 6G derivative (commercial name: Spilon Red, made by HODOGAYA CHEMICAL CO., LTD.) and 0.5 g of Nigrosine Base (C.I. Solvent Black 7, Oriento Kagaku Kabushiki Kaisha) were dissolved under heating into a mixture of 3 g of lauric acid, 20 g of polyol oleic acid ester, 10 g of sorbitan monooleate and 7 g of dioctyl azelate. Further, 3.5 g of a paraffin oil was added thereto. The resultant was kneaded and dispersed by means of a roll mill having three rolls to give an ink composition.

0.5 g of a porous body of a nonwoven fabric (made of a polyethylene terephthalate fiber of 10 deniers, porosity: 85%, length 50 mm×width 14 mm×thickness 6 mm) was impregnated with 2.7 g of the obtained ink composition to give an ink-retaining element. The ink-retaining element was placed in an ink tank. The ink tank was mounted in a commercially available dot impact printer (made by Oki Electric Industry Co., Ltd., Model ML-192) in combination with an endless ribbon having a circumference length of 1.8 m made of a nylon 66 ribbon substrate having a thickness of 120 μm and printing was conducted. As a result, a clear print image having a good durability was obtained.

With respect to the ink-retaining element, the formation of Michler's ketone was investigated after the accelerating treatment for one month in the same manner as in Example 1. As a result, the formation of Michler's ketone was not absolutely observed.

COMPARATIVE EXAMPLE 10

The exactly same procedures and materials as in Example 12 except that a dye base prepared from C.I. Basic Blue 8 was used instead of C.I. Solvent Blue 5 in Example 12 were used to prepare an ink composition and to produce an ink-retaining element.

The same tests as in Example 12 were conducted with respect to the ink-retaining element. A print image of the same quality as in Example 12 was obtained. However, the formation of Michler's ketone due to the change with the passage of time was observed. About 4.6% by weight of Michler's ketone was contained in the ink after the accelerating treatment for one month.

EXAMPLE 13

0.1N NaOH was added dropwise to a solution prepared by dissolving 20 g of C.I. Basic Green 1 as a dye into 2 l of distilled water. A gray-brown precipitate was formed and the color of the solution was gradually lightened. The thus formed precipitate was taken by filtration and washed with distilled water several times and dried to give a base of the dye.

0.5 g of the dye base and 4.5 g of Phthalocyanine Green (C.I. Pigment Green 7) were added to 10 g of carnauba wax, 30 g of stearic acid and 5 g of xylene resin, and the resultant was kneaded and dispersed by means of a roll mill having three rolls heated up to 95° C. to give a green ink composition.

The ink composition was applied to a polyethylene terephthalate film having a thickness of 5 μm by hot-melt coating to give a one-time thermal transfer ink ribbon. The coating amount of the ink composition was 4 g/m$^2$. The obtained ink ribbon was mounted in a commercially available personal computer (made by SEIKO EPSON CORPORATION) and printing was conducted. As a result, a clear green print image was obtained.

COMPARATIVE EXAMPLE 11

The exactly same materials and procedures as in Example 13 except that the dye in Example 13 was changed to C.I. Basic Green 4 to prepare an ink composition, by use of which a thermal transfer ink ribbon was produced. The same tests as in Example 13 were conducted with respect to the ink ribbon. As a result, a printing result of the same quality as in Example 13 was obtained.

EXAMPLES 14 AND 15 AND COMPARATIVE EXAMPLES 12 AND 13

Each of the lake pigments derived from triphenylmethane dyes shown in Table 4 was added as a coloring agent to the vehicle shown in Table 4 and the resultant was kneaded and dispersed at 95° C. by means of a roll mill having three rolls to prepare an ink composition. By using the ink composition, a thermal transfer ink ribbon was prepared in the same manner as in Example 13.

EXAMPLE 16

Into a solution prepared by dissolving 20 g of C.I. Basic Blue 7 as a dye into 1.5 l of distilled water was added a solution prepared by dissolving 13 g of sodium dodecylbenzenesulfonate into 500 ml of distilled water. The formed precipitate was recovered and washed with water and dried to give a dodecylbenzenesulfonic acid salt of the dye.

The obtained dye salt was used to prepare an ink composition having the formula shown in Table 4.

The obtained ink composition was dispersed or dissolved into a 1:1 mixed liquid of methyl ethyl ketone and xylene. The resultant was applied to a polyethylene terephthalate film having a thickness of 5 $\mu m$ by means of a bar coater and dried to give a multi-usable thermal transfer ink ribbon. The dry coating amount of the ink composition was 8 $g/m^2$.

COMPARATIVE EXAMPLE 14

The exactly same materials and procedures as in Example 16 except that the dye in Example 16 was changed to C.I. Basic Blue 8 were used to prepare an ink composition, by use of which a multi-usable thermal transfer ink ribbon was produced.

TABLE 4

| | Ex. No. | | | | Com. Ex. No. | | | |
|---|---|---|---|---|---|---|---|---|
| Composition (g) | 13 | 14 | 15 | 16 | 11 | 12 | 13 | 14 |
| C.I. Basic Green 1 dye base | 0.5 | — | — | — | — | — | — | — |
| C.I. Basic Green 4 dye base | — | — | — | — | 0.5 | — | — | — |
| C.I. Pigment Blue 14 | — | 0.5 | — | — | — | — | — | — |
| C.I. Pigment Violet 39 | — | — | — | — | — | 0.5 | — | — |
| C.I. Pigment Green 1 | — | — | 0.5 | — | — | — | — | — |
| C.I. Pigment Green 4 | — | — | — | — | — | — | 0.5 | — |
| C.I. Basic Blue 7 dodecylbenzene-sulfonic acid salt | — | — | — | 8 | — | — | — | — |
| C.I. Basic Blue 8 dodecylbenzene-sulfonic acid salt | — | — | — | — | — | — | — | 8 |
| Phthalocyanine Green | 4.5 | — | — | — | 4.5 | — | — | — |
| C.I. Pigment Blue 1 | — | — | — | 12 | — | — | — | 12 |
| Carnauba wax | 10 | 10 | 10 | — | 10 | 10 | 10 | — |
| Stearic acid | 30 | 30 | 30 | — | 30 | 30 | 30 | — |
| Xylene resin | 5 | 5 | 5 | — | 5 | 5 | 5 | |
| TDI-modified oxidized paraffin wax* | — | — | — | 15 | — | — | — | 15 |
| Sorbitain stearate | — | — | — | 5 | — | — | — | 5 |
| Modified montan wax | — | — | — | 5 | — | — | — | 5 |
| Polymethyl methacrylate resin | — | — | — | 5 | — | — | — | 5 |
| Diatomaceous earth | — | — | — | 10 | — | — | — | 10 |

TABLE 4-continued

*Wax prepared by modifying an oxidized paraffin with tolylenediisocynate

EXAMPLE 17

C.I. Basic Blue 7 was converted to a dodecylbenzenesulfonic acid salt thereof in the same manner as in Example 16.

The obtained dye salt was used to prepare an ink composition having the following formula.

| Component | Amount (g) |
|---|---|
| C.I. Basic Blue 7 dodecylbenzenesulfonic acid salt | 0.5 |
| Phthalocyanine Blue | 2 |
| Oxidized paraffin wax | 15 |
| Montan wax | 10 |
| Castor roil | 8 |
| Sorbitan monooleate | 1.5 |
| Diethylhexyl sebacate | 3 |

The obtained ink composition was applied to a polyethylene terephthalate film having a thickness of 7 $\mu m$ by means of a hot-melt coater to give a one-time pressure-sensitive transfer ink ribbon. The coating amount of the ink composition was 3 $g/m^2$.

COMPARATIVE EXAMPLE 15

The exactly same materials and procedures as in Example 17 except that the dye in Example 17 was changed to C.I. Basic Blue 8 were used to prepare an ink composition and to produce a one-time pressure-sensitive transfer ink ribbon.

EXAMPLE 18

Into 500 ml of water were dissolved 0.5 g of C.I. Basic Blue 7 and 0.5 g of C.I. Basic Green 1. 10 g of carbon black was added thereto and uniformly dispersed by means of ultrasonic wave.

A solution prepared by dissolving 3 g of sodium tannate into 100 ml of distilled water was added dropwise to this liquid to convert the dye to a lake pigment and the agitation was continued at about 50° C. for about 2 hours. Thereafter the solid was taken by filtration and fully washed with water and dried to give a carbon black toner wherein carbon black was coated with the lake pigment.

7 g of the obtained carbon black toner, 8 g of isostearic acid, 10 g of a mineral oil, 3 g of vinyl chloride-vinyl acetate copolymer and 2 g of diatomaceous earth were dispersed or dissolved into 70 g of methyl ethyl ketone (MEK).

The MEK solution was applied to a polyethylene terephthalate film having a thickness of 7 $\mu m$ in an amount of 20 $g/m^2$ in sold basis after drying to give a multi-usable pressure-sensitive transfer ink ribbon.

The obtained ink ribbon was mounted in an electronic typewriter (AP-500) made by CANON INC. As a result, printing could be repeated 20 or more times at the same portion of the ink ribbon.

COMPARATIVE EXAMPLE 16

The same procedures as in Example 18 except that the dye in Example 18 was changed to 0.5 g of C.I. Basic Blue 8 and 0.5 g of C.I. Basic Green 4 were repeated.

The formation of Michler's ketone was investigated with respect to each of the ink ribbons obtained in Examples 13 to 18 and Comparative Examples 11 to 16.

That is, after each ink ribbon was subjected to the accelerating treatment for one month, the amount of Michler's ketone in the ink was determined as follows.

The ink ribbon was taken and weighed so that the weight of the ink is about 0.1 g and the ink was dissolved into about 10 ml of tetrahydrofuran. An equal amount of isopropyl alcohol was added to precipitate and deposit the waxes and the mixture was filtered through a membrane filter. The filtrate was diluted ten-fold with a mixed solvent of water-acetonitrile. Michler's ketone was determined by means of a HPLC device using ODSC 18 column, made by Waters. The determination was conducted by using an analitical curve prepared by using a reagent grade of Michler's ketone. The results thereof are shown in Table 5 with the respective ink compositions.

TABLE 5

| | Ex. 13 | Ex. 14 | Ex. 15 | Ex. 16 | Ex. 17 | Ex. 18 | Com. Ex. 11 | Com. Ex. 12 | Com. Ex. 13 | Com. Ex. 14 | Com. Ex. 15 | Com. Ex. 16 |
|---|---|---|---|---|---|---|---|---|---|---|---|---|
| Amount of Michler's ketone in ink (% by weight) | 0 | 0 | 0 | 0 | 0 | 0 | 0.61 | 0.43 | 0.52 | 6.0 | 0.54 | 0.95 |

As is clear from Table 5, the solid ink composition of the present invention does not generate Michler's ketone.

We claim:

1. A printer ink composition containing a coloring agent and a vehicle, comprising, as a triphenylmethane dye or a lake pigment derived therefrom as the coloring agent, a triphenylmethane dye having general formula (I):

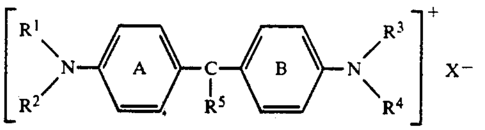

(I)

wherein $R^1$, $R^2$, $R^3$ and $R^4$ are independently hydrogen atom, an alkyl group, an aralkyl group or an aryl group, $R^5$ is an aryl group, X is a counter ion, and ring A or ring B may be substituted by one or more substituents, provided that at least one group among $R^1$, $R^2$, $R^3$ and $R^4$ is not methyl and in the case that $R^5$ is p-dimethylaminophenyl, at least one of $R^1$ and $R^2$ and at least one of $R^3$ and $R^4$ are not methyl; or a lake pigment derived therefrom, wherein said vehicle is a solid vehicle and said printer ink composition is a solid ink.

2. The ink composition of claim 1, wherein said triphenylmethane dye or lake pigment derived therefrom is that wherein $R^1$, $R^2$, $R^3$ and $R^4$ in general formula (I) are ethyl.

3. The printer ink composition of claim 1, wherein said printer ink composition is a thermal transfer ink.

4. The printer ink composition of claim 1, wherein said printer ink composition is a pressure sensitive transfer ink.

* * * * *